US 6,595,640 B1

United States Patent
Jubin

(10) Patent No.: US 6,595,640 B1
(45) Date of Patent: Jul. 22, 2003

(54) METHOD FOR DESIGNING CONTACT LENSES

(75) Inventor: Philippe Jubin, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 83 days.

(21) Appl. No.: 09/713,461

(22) Filed: Nov. 15, 2000

(51) Int. Cl.[7] .................................................. G02C 7/04
(52) U.S. Cl. .................................... 351/177; 351/160 R
(58) Field of Search .......................... 351/177, 160 R, 351/160 H, 161, 162, 159, 178

(56) References Cited

U.S. PATENT DOCUMENTS

| | | |
|---|---|---|
| 4,573,121 A | * 2/1986 | Saigo et al. ................. 351/178 |
| 5,173,723 A | 12/1992 | Volk |
| 5,452,031 A | 9/1995 | Ducharme |
| 5,953,098 A | 9/1999 | Lieberman et al. ......... 351/177 |
| 6,082,856 A | 7/2000 | Dunn et al. |
| 6,305,802 B1 | 10/2001 | Roffman et al. |

FOREIGN PATENT DOCUMENTS

WO   WO 0058773 A   10/2000

OTHER PUBLICATIONS

PCT International Search Report PCT/US01/47090 dated Jul. 19, 2002.

* cited by examiner

Primary Examiner—Scott J. Sugarman
(74) Attorney, Agent, or Firm—Lois Gianneschi

(57) ABSTRACT

The invention provides methods for designing contact lenses in which method the thickness in the lens periphery is precisely controlled.

16 Claims, 4 Drawing Sheets

METHOD FOR DESIGNING CONTACT LENSES

FIELD OF THE INVENTION

The invention relates to methods for designing contact lenses. In particular, the invention provides a method for designing contact lenses in which the thickness in the lens periphery is precisely controlled.

BACKGROUND OF THE INVENTION

The use of contact lenses for purposes of visual acuity correction and cosmetics is well known. It is important in the design of a contact lens to provide for good handling, comfort, centration, and orientation of the lens. Each of these lens characteristics is dependent to a large extent on the thickness profile of the lens periphery.

Conventional methods for controlling the thickness of the lens periphery include the use of one or more of lenticular zones, bevels, chamfers, and the like. However, these methods do not provide precise control of the thickness differential of the lens periphery. Additionally, these methods do not provide a means for designing a non-rotationally symmetric lens. Therefore, a need exists for a method for designing contact lenses that overcomes these disadvantages.

DETAILED DESCRIPTION OF THE INVENTION AND PREFERRED EMBODIMENTS

The invention provides a method, and lenses produced using the method, for designing articles, preferably ophthalmic lenses, in which the thickness of the periphery may be precisely controlled. Thus, the method provides for precise control of the thickness differential of the periphery and the location of the differential on the periphery. Finally, the method provides a ready means for designing non-rotationally symmetric articles.

In a preferred embodiment, the invention provides a method for designing an ophthalmic lens, the method comprising, consisting essentially of, and consisting of:

a.) generating a thickness map for at least a portion of the periphery of the lens; and b.) deriving a geometry for at least a portion of the lens periphery from the thickness map. In another preferred embodiment, the invention provides an ophthalmic lens produced by this method.

By "ophthalmic lens" is meant a spectacle lens, contact lens, intraocular lens, onlay lens, or the like. Preferably, the lens designed using the method of the invention is a contact lens. For purposes of the invention, by "lens periphery" or "periphery of the lens" is meant the portion of the lens that is outside of the optic zone.

For the lens of the invention, the optical properties of its base curve and optical zones may be designed in any conventional manner. The base curve and optical curve may be described in any manner, as long as for a given diameter D on the base curve, the corresponding sag value S may be derived.

Figure 1:
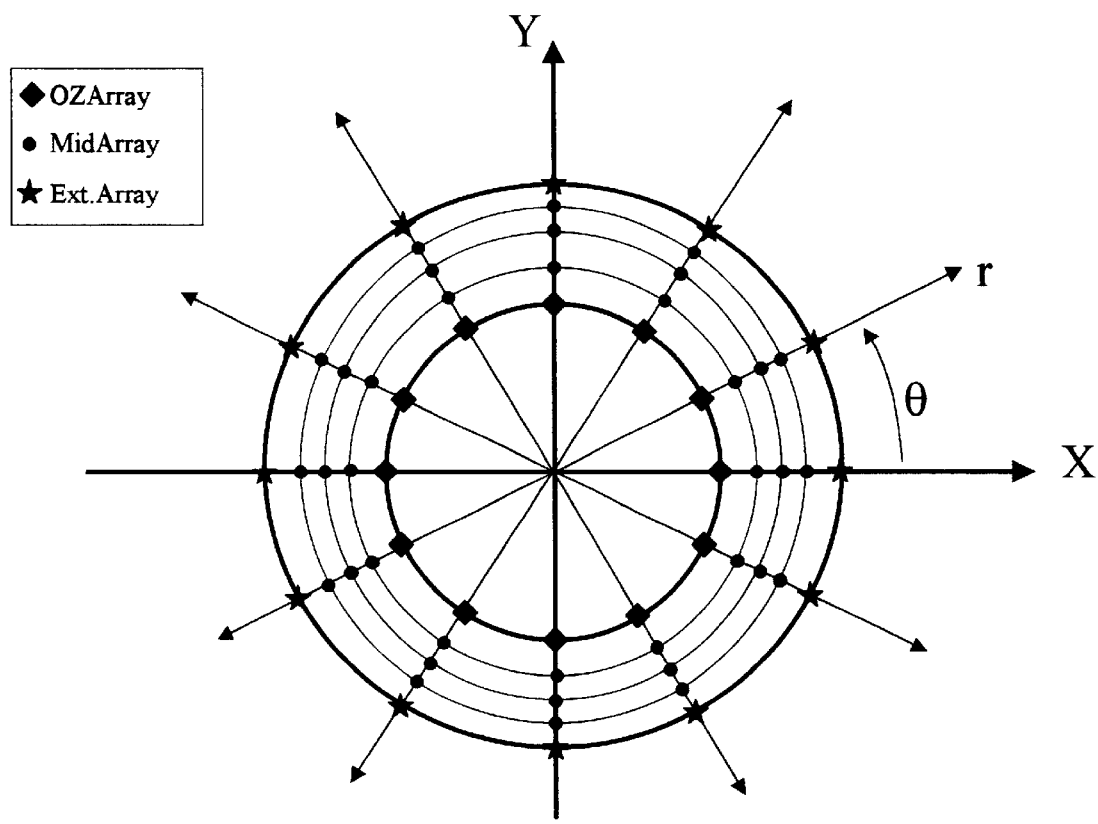
FIG. 1 is a depiction of a coarse mesh used in the method of the invention.

In a preferred method, at least a portion of, and preferably all of, the lens periphery is first described using parallels and meridians, as shown in FIG. 1, to define a coarse mesh. The location of all of the intersecting points of the mesh are recorded as Cartesian, cylindrical, or spherical coordinates and stored in arrays. The greater the number of points used, the greater will be the precision for controlling the lens periphery thickness.

Further, the intersecting points are divided into at least three families of arrays: optic zone array points that are located at the innermost border of the periphery; exterior array points that are located at the outermost border of the periphery; and mid-array points that are located between the inner and outermost array points. In FIG. 1 is depicted representative members of each of these arrays.

Figure 2:
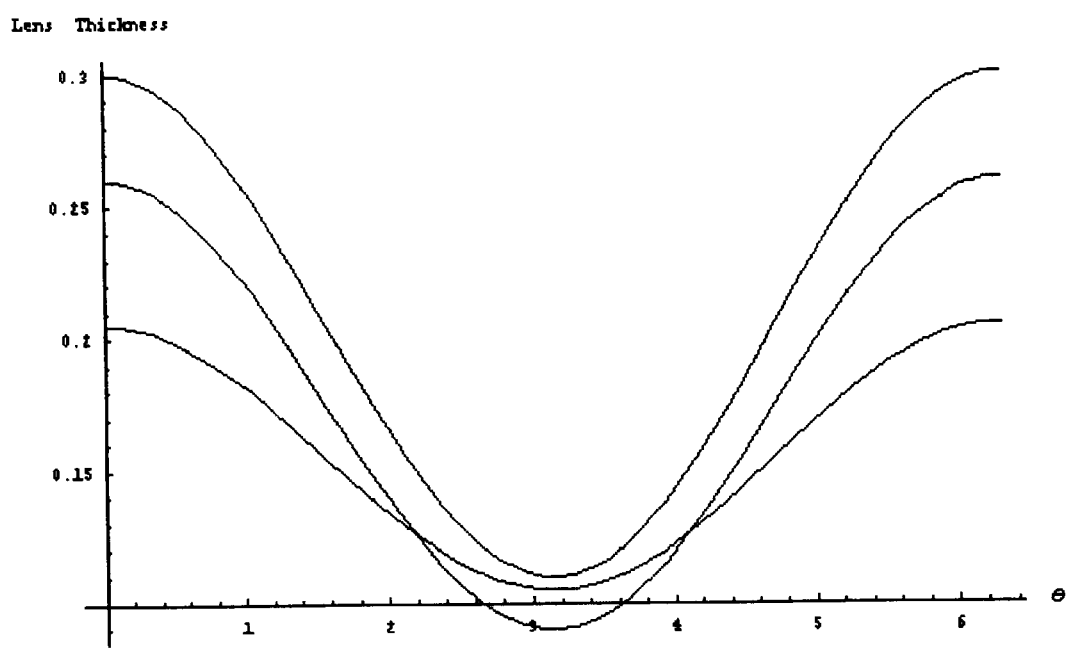
FIG. 2 is a graph of the thickness variations of several parallels of FIG. 1.

The thickness differential or, preferably, the thickness variation then is defined for each parallel of the mesh. Preferably, this is carried out by one of two methods. First, a set of functions may be used to define the thickness variation along each parallel. The variations may be a function of any or all of the Cartesian, cylindrical, and spherical functions. For example, the variation may be a function of the angle of rotation θ. Referring to FIG. 2, the lens thickness along three parallels is shown. The function may be of any form. Preferably, the function is selected so that it creates a smooth surface, provides the means for creating non-axisymmetric lenses with thin zones for better centering, and is reasonably easy to visualize. Suitable functions include, without limitation, functions of the following form $$\text{Lens Thickness} = A*\cos(\theta) + B$$

$$\text{Lens Thickness} = A*\cos(B\theta + C) + D,$$

wherein A is the maximum thickness differential in each parallel and D is the thickness at θ–90°

$$\text{Lens Thickness} = A*\cos\bigcirc 2(B.\theta + C) + D*\sin\bigcirc 2(E.\theta + C)$$

$$\text{Lens Thickness} = A*|\cos(B.\theta + C| + D, \text{ for } \theta = [0, Pi]$$

$$\text{Lens Thickness} = A*(1 + |\sin\theta|), \text{ for } \theta = ]Pi, 2.Pi[$$

The number of functions that need to be defined are equal to Nr, or the number of parallels. One ordinarily skilled in the art will recognize that, in addition to trigonometric functions, any suitable function may be used including, without limitation, exponential, series, logarithmic, polynomial, step functions, and the like. Preferably, trigonometric functions are used and more preferably trigonometric functions are used in conjunction with step functions. Alternatively, the thickness variations may be defined manually at every point. In this method, the thickness of the lens at every point is specified. However, this method is disadvantageous because it is cumbersome. The resulting thickness for each intersection point, the number of points which equals Nr*Nθ wherein Nθ is the number of meridians, is calculated and recorded.

In the second step of the method, a geometry of the lens periphery is derived from the thickness map. This step is carried out by first refining the coarse mesh to the desired accuracy in order to define the lens periphery more precisely. The refined, or fine, mesh describes the same lens geometry, but uses a greater number of points than does the coarse mesh. For example, referring to FIG. 1, the coarse mesh has Nr*Nθ intersection points, or 60. In the fine mesh, there may be, for example, 3600 points. The precise number of points used will be determined by balancing the use of as many points as possible to obtain a better lens definition against the computation time and storage space required for the information along with the fact that the lathes used to cut the tools for the lens may not be able to cut with the level of accuracy necessary for a large number of points.

The thickness and coordinates of the coarse mesh points are used to derive the thickness and z coordinates of the fine mesh points. For fine mesh points located on one of the parallels, the function corresponding to the parallel is used to derive the thickness of that point. For fine mesh points falling on one of the meridians, an approximation is used to derive the lens thickness. Suitable approximations may be made by selecting a function type and from that function type, deriving the curve that best fits the data points. Examples of useful function types include, without limitation, polynomial function, conic functions, exponential functions, rational functions, logarithmic functions, trigonometric functions, and the like. Additionally and preferably, cubic spline approximations, or a series of special polynomials, may be used.

Figure 3:
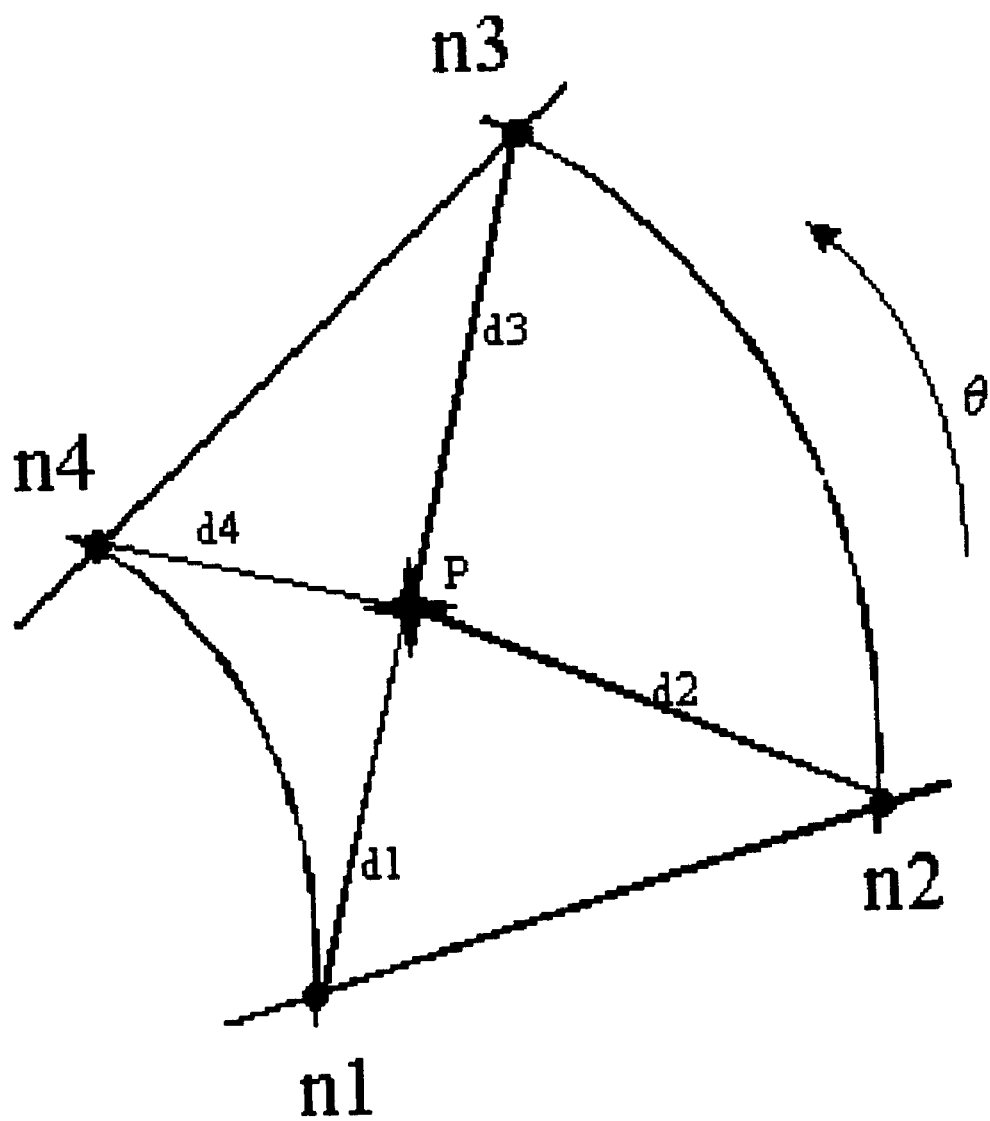
FIG. 3 is a depiction of intersection points of the mesh of FIG. 1 and a point falling between the parallels and meridians of that mesh.

In the case of a fine mesh point that falls between the meridians and parallels, adjacent points falling on the parallels and meridians may be used to determine the fine mesh point's properties. Referring to FIG. 3, points n1 through n4 are shown along with fine mesh point P. The distance between N1 through n4 to point P is d1, d2, d3, and d4, respectively. The thickness at point P may be calculated by any suitable method including, without limitation, the use of bilinear interpolation, bicubic interpolation, bicubic splines, and the like. A quick, but crude method is as follows:

$$T(P) = w1*T(n1) + w2*T(n2) + w3*T(n3) + w4*T(n4)$$

wherein T is thickness and where SumD=d1+d2+d3+d4, and w1=[131 d1/SumD]/3
w2=[131 d2/SumD]/3
w3=[131 d3/SumD]/3
w4=[131 d4/SumD]/3

Alternatively, a three-dimensional cubic spline approximation may be used to approximate the location of the fine mesh points. Three-dimensional cubic spline approximations and their use are described in *Numerical Recipes in Fortran 77: The Art of Scientific Computing*, Cambridge Press (1996).

Figure 4:
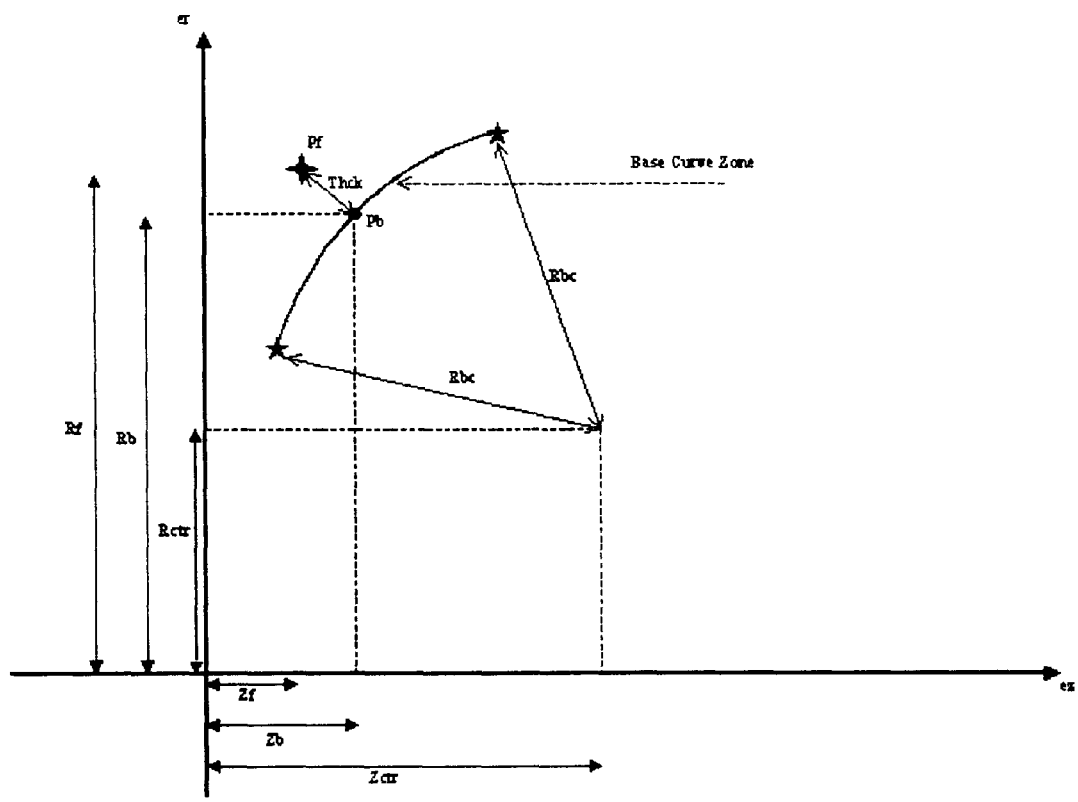
FIG. 4 is a graph for use in the method of the invention.

Once the thickness is calculated for all of fine mesh points, the z coordinates (or p for spherical coordinates) may be derived. Referring to FIG. 4, an example for a spherical base curve zone is shown. In FIG. 4, Pf(Zf, Rf) is the point on the front surface for which the z coordinate is to be derived, Rbc is the base curve radius, and (Zctr, Rctr) are the coordinates of the center of the base curve and Thck is the thickness at Pf. Zf is found using the following formula:

$$Zf = Zctr \pm \sqrt{(Rbc + Thck)^2 - (Rf - Rctr)^2}$$

In the case in which the base curve is non-spherical, the procedure may be more complicated, but may be summarized as follows: a.) offset the base curve by Thck; b.) intersect the offset curve with line r=Rf, wherein r=Rf is an equation for a line containing all of the points with y-coordinate Rf in a Cartesian coordinate system; and c.) select the correct solution if there are more than one solutions. One ordinarily skilled in the art will recognize that the correct solution will depend on the form of the equation of the offset curve.

In this way, all or a portion of the geometry of the lens periphery may be fully described as a point cloud. The lens periphery designed according to the method of the invention may be used in the design of any type of ophthalmic lens, but preferably is used in designing contact lenses and more preferably contact lens that are spherical, multifocal, toric, or combinations thereof. However, the method may find its greatest utility in the design of toric contact lenses.

What is claimed is:

1. A method for designing an ophthalmic lens comprising the steps of: a.) generating a thickness map for at least a portion of the periphery of the lens by the steps comprising:
    i.) describing at least a portion of the lens periphery using a plurality of parallels and meridians to define a coarse mesh;
    ii.) recording intersection points of the parallels and meridians as one of Cartesian, cylindrical, or spherical coordinates; and
    iii.) defining a thickness variation for each of the plurality of parallels; and calculating a thickness for each intersection point; and b.) deriving a geometry for at least a portion of the lens periphery from the thickness map.

2. The method of claim 1, wherein the lens is a contact lens.

3. The method of claim 2, wherein the lens is a non-rotationally symmetric lens.

4. The method of claim 2, wherein step b.) further comprises refining the coarse mesh by- deriving coordinates and thicknesses for a plurality of points in addition to the intersection points of the coarse mesh.

5. The method of claim 1, wherein substep iii.) is carried out by defining a thickness variation using a function selected from the group consisting of trigonometric, exponential, series, logarithmic, polynomial, and step functions, and combinations thereof.

6. The method of claim 1, wherein substep iii.) is carried out by defining a thickness variation using a trigonometric function.

7. The method of claim 1, wherein substep iii.) is carried out by defining a thickness variation using a trigonometric function and a step function.

8. The method of claim 4, wherein in step b.), the coordinates are derived using the formula:

$$Zf = Zctr \pm \sqrt{(Rbc + Thck)^2 - (Rf - Rctr)^2}$$

wherein Rbc is a base curve radius, Zctr and Rctr are the coordinates of the center of the base curve, Thck is the thickness at the point on the front surface for which the coordinate is to be derived.

9. The method of claim 4, wherein step b.) further comprises:
    i.) offsetting a base curve by a thickness at a point on a surface for which the coordinates are to be derived;
    ii.) intersecting the offset base curve with a line; and
    iii.) selecting a solution.

10. The method of claim 4, wherein step b.) is carried out by approximating locations for the fine mesh points using a three-dimensional cubic spline approximation.

11. An ophthalmic lens designed according to the method of claim 1.

12. An ophthalmic lens designed according to the method of claim 2.

13. An ophthalmic lens designed according to the method of claim 3.

14. A contact lens designed according to the method of claim 4.

15. A contact lens designed according to the method of claim 7.

16. A contact lens designed according to the method of claim 9.

* * * * *